United States Patent [19]
Strole et al.

[11] 3,740,653
[45] June 19, 1973

[54] THREE WIRE DIGITAL SYNCHRONIZER

[75] Inventors: John C. Strole, Dumont, N.J.;
Laszlo I. Szerenyi, Frederick, Md.;
Harold Moreines, Springfield, N.J.

[73] Assignee: The Bendix Corporation, Teterboro, N.J.

[22] Filed: Dec. 21, 1970

[21] Appl. No.: 100,501

Related U.S. Application Data

[62] Division of Ser. No. 738,045, June 18, 1968, Pat. No. 3,629,711.

[52] U.S. Cl. .................. 328/150, 307/235, 328/137
[51] Int. Cl. ............................................ H03k 17/00
[58] Field of Search .................... 307/235; 328/137, 328/146, 147, 150

[56] References Cited
UNITED STATES PATENTS

| | | | |
|---|---|---|---|
| 3,305,735 | 2/1967 | Moreines | 307/235 |
| 3,492,588 | 1/1970 | Woodward, Jr. | 307/235 |
| 3,551,824 | 12/1970 | Rotier | 307/235 X |
| 3,479,604 | 11/1969 | Abernathy | 328/147 X |

Primary Examiner—John W. Huckert
Assistant Examiner—B. P. Davis
Attorney—S. H. Hartz and Plante, Arens, Hartz & O'Brien

[57] ABSTRACT

A three-wire digital synchronizer for use in an aircraft for synchronizing flight data to prevent an abrupt change in aircraft attitude when switching from manual to automatic control. Converting means are provided for converting the intermediate output of a three-wire signal device, such as a synchro, to pulses related in quantity to the actual flight of the aircraft. A counter/register counts the pulses and applies the count to a register until control of the aircraft is switched from manual to automatic control whereupon the count present in the register is locked in but the count in the counter/register continues to change in accordance with the flight data. A subtractor determines the difference in count contained in the counter/register and the register and the difference is used to automatically correct flight of the aircraft.

2 Claims, 7 Drawing Figures

THREE WIRE DIGITAL SYNCHRONIZER

This application is a division of U. S. application Ser. No. 738,045, filed June 18, 1968, now U.S. Pat. No. 3,629,711.

BACKGROUND OF THE INVENTION

1. Field of the Invention

This invention relates to synchronizers for synchronizing automatic control flight data with current flight data and, more particularly, to a digital synchronizer for use with three-wire signal devices, such as synchros.

2. Description of the Prior Art

Electromechanical devices were used heretofore for synchronizing flight data but these devices had disadvantages with regard to weight, space, power and reliability.

In order to overcome these disadvantages, solid state digital synchronizers were developed but they are subject to ambiguities unless the range is limited. Also, the synchronizers as used heretofore were linear over only a small range because the output was proportional to the sine of the difference in the angle of the synchro corresponding to actual flight data and the angle of the synchro when automatic flight control was effective. The present invention has all the advantages of the solid state digital synchronizer yet is not limited in range to avoid ambiguities and the output is linear over the entire range.

SUMMARY OF THE INVENTION

The present invention uses a three-wire digital synchronizer for synchronizing flight data of an aircraft while the aircraft is flown manually. A selector controls a sampling circuit for selecting an intermediate output of a signal device providing three outputs corresponding to the aircraft's actual flight condition. A hold circuit converts the output of the sampling circuit to a d.c. voltage and applies the d.c. voltage to a detector which provides timing pulses related in number to the actual flight condition. A counter/register counts the timing pulses and applies the count to a register during manual control of the aircraft. When control of the aircraft is switched to the automatic mode, the count is locked in the register to provide reference flight data. The outputs of the counter/register and the register are applied to a serial subtractor. The serial subtractor determines the difference between the two counts and the difference is stored in a second register. The second register output is applied to an indicator and to a digital-to-analog converter for controlling the automatic flight of the aircraft.

One object of the invention is to provide a smooth transition from manual control of the aircraft to automatic control using digital techniques.

Another object of the invention is to convert three-wire synchro date to digital form.

Another object of the invention is to provide an electronic synchronizer having less size and weight, requiring less power, and having increased reliability in relation to electromechanical synchronizers.

Another object of the invention is to provide a solid state synchronizer with unlimited range.

Another object of the invention is to provide an error voltage linearly related throughout the entire range to the difference between an angle corresponding to actual flight of the aircraft and an angle corresponding to a reference flight.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
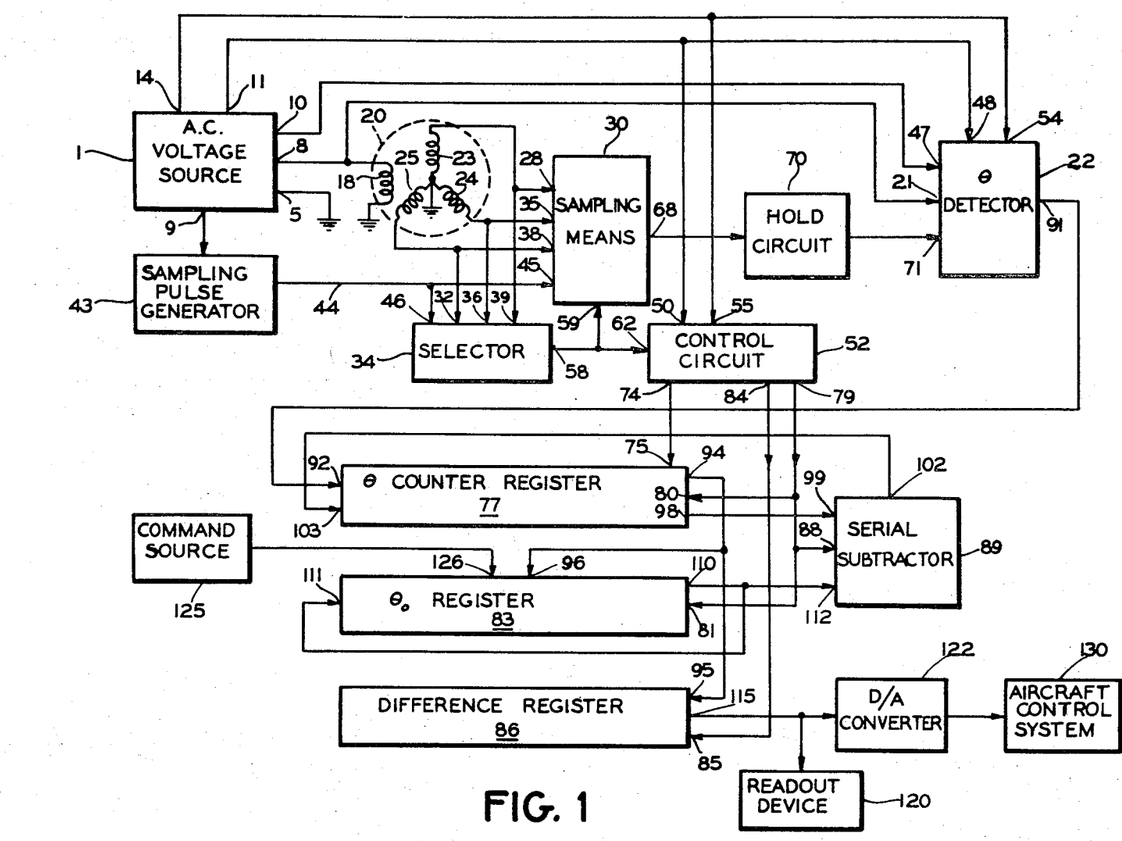
FIG. 1 is a block diagram showing one embodiment of a synchronizer constructed in accordance with the present invention.

Referring to FIG. 1, an a.c. voltage source 1 supplies sinusoidal voltages of one phase at terminals 8 and 9 and of opposite phase at terminal 10 and square wave voltages at terminals 11 and 14 having frequencies differing in accordance with a ratio of 512:1. Source 1 is grounded at terminal 5. The frequency of the sinusoidal voltage and of the lesser frequency square wave preferably are the same for conveninece. Output terminal 8 of source 1 is connected to one end of a rotor winding 18 of a signal device 20 and to a terminal 21 of a detector 22. The opposite end of the rotor winding 18 is connected to ground. Signal device 20 is a conventional type synchro with stator windings 23, 24 and 25 having a common connection to ground.

Stator windings 23, 24 and 25 are connected to terminals 28, 35 and 38 of a sampling means 30 and to terminals 32, 36 and 39 of an operation range selector 34.

A sampling pulse generator 43 of conventional type is connected to terminal 9 of source 1 and generates sampling pulses coincident with the positive peak amplitudes of the sinusoidal voltage appearing on terminals 8 and 9 of source 1. The sampling pulses from generator 43 are applied to a terminal 45 of sampling means 30 and to a terminal 46 of selector 34.

Terminal 10 of source 1 is connected to a terminal 47 of detector 22. Terminal 11 of source 1 is connected to a terminal 48 of detector 22 and a terminal 50 of a control circuit 52. Terminal 14 of source 1 is connected to a terminal 54 of detector 22 and to a terminal 55 of control circuit 52.

An output terminal 58 of selector 34 is connected to a terminal 59 of sampling means 30 and to a terminal 62 of control circuit 52.

An output terminal 68 of sampling means 30 is connected to an input of a hold circuit 70. The hold circuit 70 may be of the conventional type.

The output of hold circuit 70 is connected to a terminal 71 of detector 22. An output terminal 74 of control circuit 52 is connected to a terminal 75 of a counter/register 77. An output terminal 79 of control circuit 52 is connected to a terminal 80 of the counter/register 77, to a terminal 81 of register 83, and a terminal 88 of a serial subtractor 89. An input terminal 84 of control circuit 52 is connected to a terminal 85 of a difference register 86.

Counter/register 77 is a 10 stage conventional counter/register capable of being preset to a specific value and being counted up or down upon command from the control circuit 52. Registers 83 and 86 are conventional 10 stage registers. Serial subtractor 89 is a conventional subtractor as described at page 341 of "Pulse, Digital, and Switching Waveforms" by J. Millman and H. Taub, McGraw Hill Book Company (1965), for subtracting one binary word from another binary word.

An output terminal 91 of detector 22 is connected to a terminal 92 of counter/register 77. An output terminal 94, representing output terminals of each stage of the counter/register 77, is connected to an input terminal 95 representing input terminals of each stage of register 86 and to input terminal 96 representing input terminals of each stage of register 83. An output terminal 98 of the output stage of the counter/register 77 is connected to an input terminal 99 of the subtractor 89. An output terminal 102 of the subtractor 89 is connected to an input terminal 103 of an input stage of the counter/register 77. A terminal 110 of an output stage of register 83 is connected to an input terminal 111 of an input stage of register 83, providing for recirculation of the register's contents, and to an input terminal 112 of the subtractor 89. A terminal 115 representing output terminals of each stage of register 86 is connected to a readout device 120 and to a first input of a conventional digital-to-analog converter 122. The output of a command source 125, providing either a high-logic level d.c. voltage or a low-logic level d.c. voltage, is connected to a terminal 126 of register 83.

Figure 2:
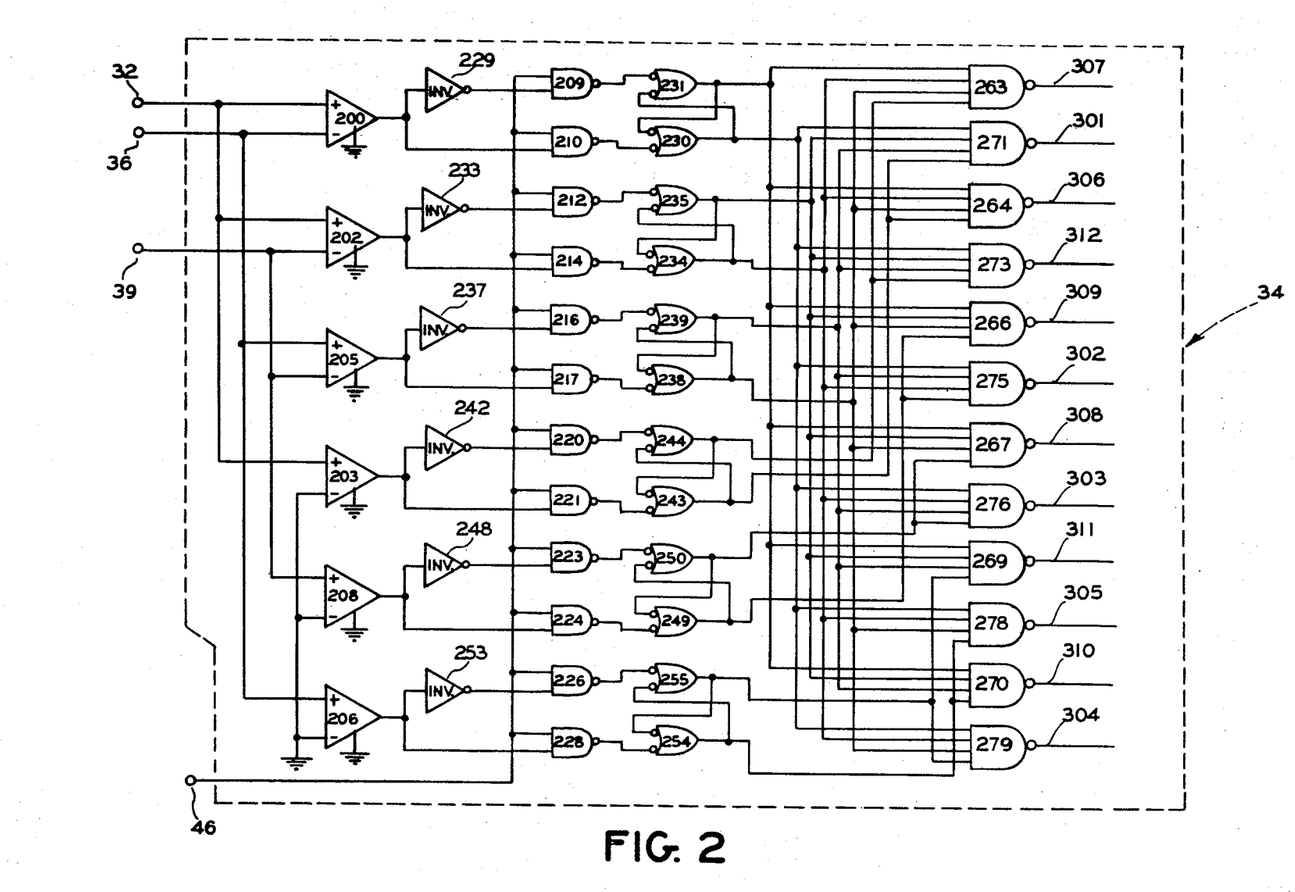
FIGS. 2, 3 and 4 are schematic diagrams of the selector, sampling means and detector, respectively, shown in FIG. 1.

Referring to FIG. 2, terminal 32 of the selector 34 is connected to positive input terminals of comparators 200, 202 and 203. The terminal 36 is connected to a negative input terminal of comparator 200, and to positive input terminals of comparators 205 and 206. Terminal 39 is connected to negative input terminals of comparators 202 and 205 and to a positive input terminal of a comparator 208. Negative input terminals of comparators 203, 206 and 208 are connected to ground.

Terminal 46 of selector 34 is connected to NAND-gates 209, 210, 212, 214, 216, 217, 220, 221, 223, 224, 226 and 228. Comparators 200, 202, 203, 205, 206 and 208 each have a first output that is grounded. Comparator 200 has a second output connected to an inverter 229 and to NAND-gate 210 whose output is applied to a NOT-OR gate 230. The output of inverter 229 is connected to NAND-gate 209 whose output is applied to a NOT-OR gate 231. A second output of comparator 202 is connected to an inverter 233 and to NAND-gate 214 whose output is applied to a NOT-OR gate 234. The output of inverter 233 is connected to NAND-gate 212 whose output is applied to a NOT-OR gate 235. A second output of comparator 205 is connected to an inverter 237 and to NAND-gate 217 whose output is applied to a NOT-OR gate 238. The output of inverter 237 is connected to NAND-gate 216 whose output is applied to a NOT-OR gate 239. A second output of comparator 203 is connected to an inverter 242 and to NAND-gate 221 whos output is applied to a NOT-OR gate 243. The output of inverter 242 is connected to NAND-gate 220 whose output is applied to a NOT-OR gate 244. A second output of comparator 208 is connected to an inverter 248 and to NAND-gate 224 whose output is applied to a NOT-OR gate 249. The output of inverter 248 is connected to NAND-gate 223 whose output is applied to a NOT-OR gate 250. A second output of comparator 206 is connected to an inverter 253 and to NAND-gate 228 whose output is applied to a NOT-OR gate 254. The output of inverter 253 is connected to NAND-gate 226 whose output is applied to NOT-OR gate 255.

The output of NOT-OR gate 231 is connected to NOT-OR gate 230 and to NAND-gates 263, 264, 266, 267, 269 and 270. The output of NOT-OR gate 230 is connected to an input of NOT-OR gate 231 and to NAND-gates 271, 273, 275, 276, 278 and 279. The output of NOT-OR gate 235 is connected to an input to NOT-OR gate 234 and to NAND-gates 266, 267, 269, 270, 271 and 273. The output of NOT-OR gate 234 is connected to an input to NOT-OR gate 235 and to NAND-gates 263, 264, 275, 276, 278 and 279. The output of NOT-OR gate 239 is connected to an input to NOT-OR gate 238 and to NAND-gates 269, 270, 271, 273, 275 and 276. NOT-OR gate 238 output is connected to an input of NOT-OR gate 239 and to NAND-gates 263, 264, 266, 267, 278 and 279. NOT-OR gate 244 output is connected to an input of NOT-OR gate 243 and to NAND-gates 263 and 273. The output of NOT-OR gate 243 is connected to an input of NOT-OR gate 244 and to NAND gates 264 and 271. The output of NOT-OR gate 250 is connected to an input of NOT-OR gate 249 and to NAND-gates 267 and 276. The output of NOT-OR gate 249 is connected to an input of NOT-OR gate 250 and to NAND-gates 266 and 275. The output of NOT-OR gate 255 is connected to an input of NOT-OR gate 254 and to NAND-gates 269 and 279. The output of NOT-OR gate 254 is connected to an input of NOT-OR gate 255 and to NAND-gates 270 and 278.

Figure 3:
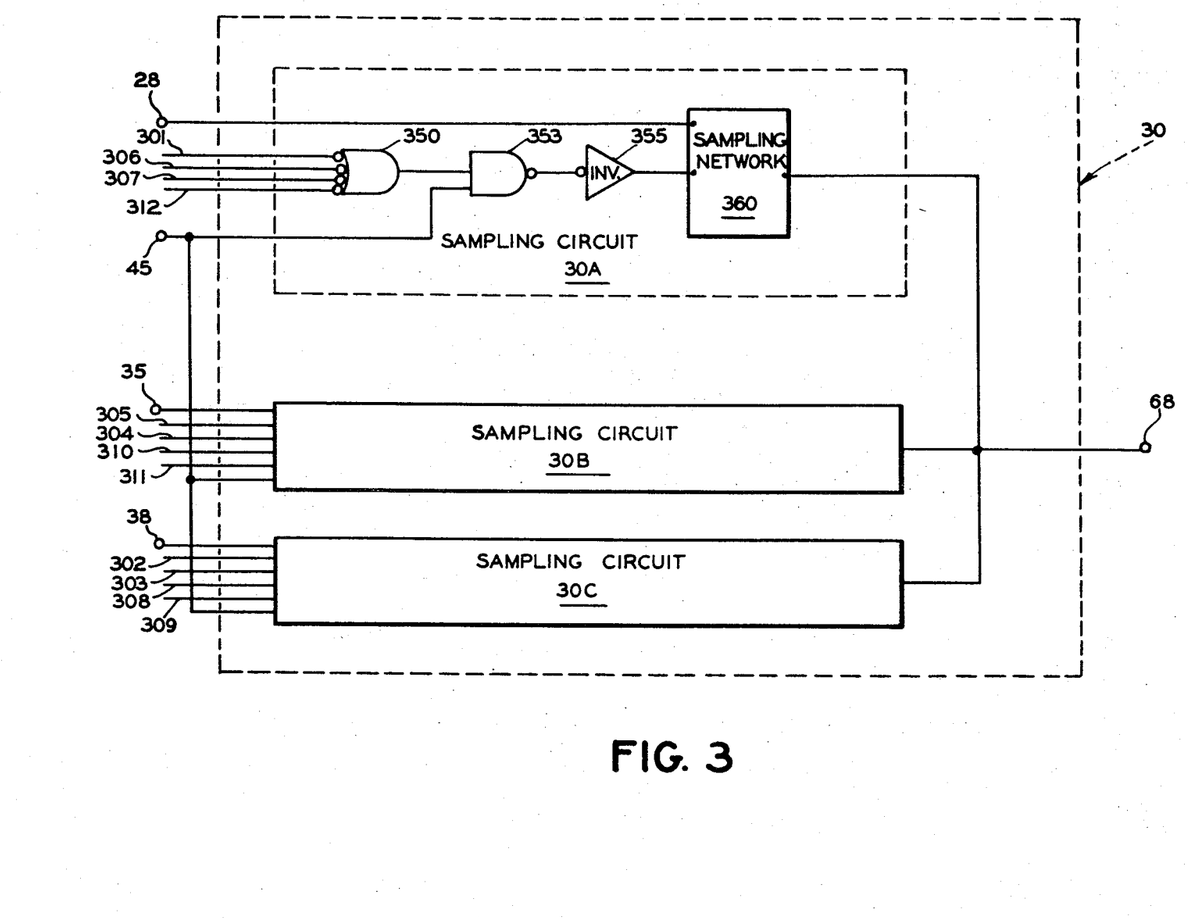

Conductors 301, 302, 303, 304, 305, 306, 307, 308, 309, 310, 311 and 312 are connected to outputs of NAND-gates 271, 275, 276, 279, 278, 264, 263, 267, 266, 270, 269 and 273, respectively. Conductors 301 through 312 interconnect the selector 34 with the sampling means 30 through terminals 58 and 59, respectively.

Referring to FIG. 3, the sampling means 30 is composed of three identical sampling circuits indicated as 30A, 30B and 30C. In circuit 30A, conductors 301, 306, 307 and 312 from the selector 34 of FIG. 2 are connected to inputs of a NOT-OR gate 350. The output of NOT-OR gate 350 is connected to an input of a NAND-gate 353. Terminal 45 is connected to a second input of NAND-gate 353. The output of NAND-gate 353 is connected to an inverter 355 whose output is connected to a sampling network 360. Sampling network 360 is a conventional circuit which may be of a type similar to a network manufactured by the Amelco Corporation and having their part number S1209. Terminal 28 is connected to sampling network 360. The output of network 360 is connected to terminal 68.

Circuits 30B and 30C are the same as circuit 30A. Conductors 304, 305, 310 and 311 from selector 34 of FIG. 2 are connected to circuit 30B. Conductors 302, 303, 308 and 309 from selector 34 of FIG. 2 are connected to circuit 30C. Terminal 45 also is connected to circuits 30B and 30C. The outputs of circuits 30B and 30C are connected to terminal 68.

Figure 4:
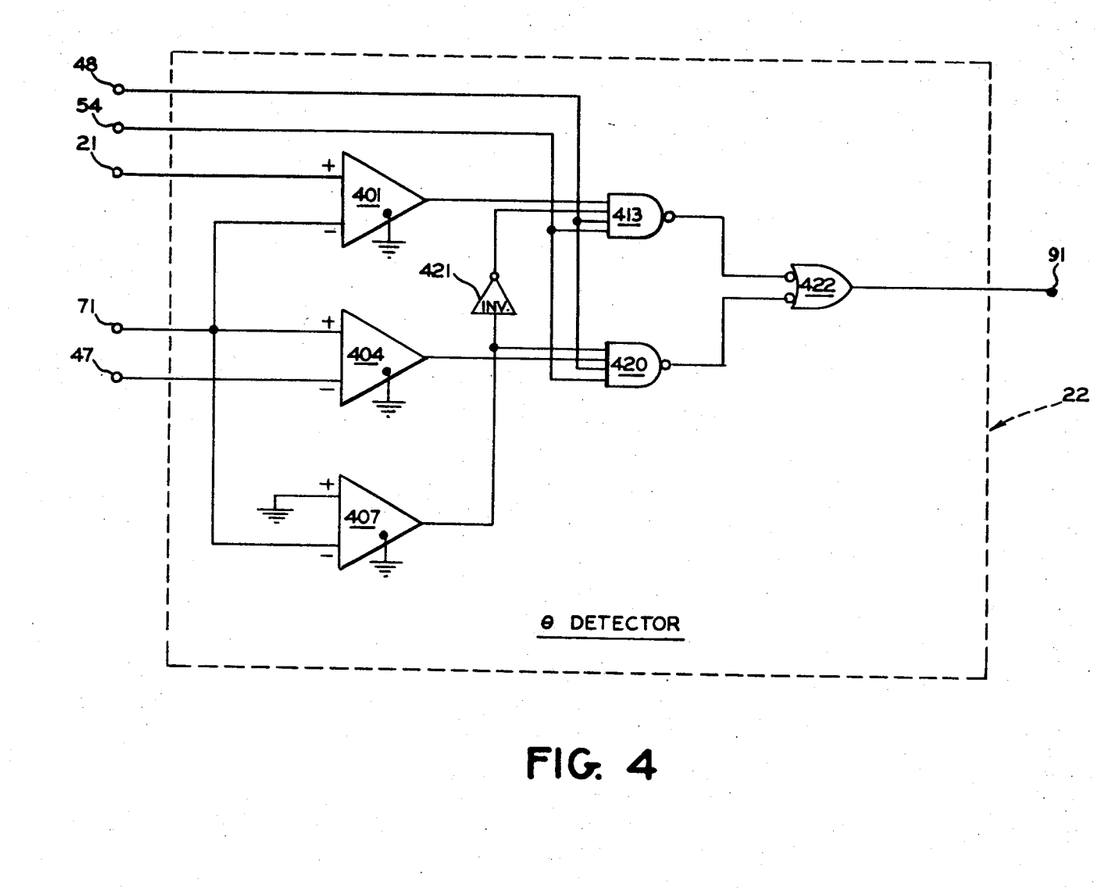

Referring to FIG. 4, detector 22 has terminal 21 connected to a positive terminal of a comparator 401. Terminal 71 is connected to a negative terminal of compartor 401 and to a positive terminal of a comparator 404 and a negative terminal of a comparator 407. Terminal 47 is connected to a negative terminal of comparator 404. A positive terminal of comparator 407 is connected to ground. First output terminals of comparators 401, 404 and 407 are connected to ground.

A second output terminal of comparator 401 is connected to a NAND-gate 413. A second output terminal of comparator 404 is connected to a NAND-gate 420. A second output of comparator 407 is connected to an inverter 421 and to NAND-gate 420. The output of inverter 421 is connected to NAND gate 413. Terminals 48 and 54 are connected to NAND gates 413 and 420 and the outputs of the NAND gates are connected to a NOT-OR gate 422. The output of NOT-OR gate 422 is connected to terminals 91.

DESCRIPTION OF OPERATION

Referring to FIG. 1, source 1 applies a 400 hertz sinusoidal excitation voltage to the rotor winding 18 of the signal device 20 and to terminal 21 of the detector 22. The signal device 20 transforms the excitation voltage into three 400 hertz outputs across stator windings 23, 24 and 25. The amplitude of each output varies as a function of the sine of the shaft angle of the signal device 20 which is related to the actual flight of the aircraft. The three said functions of the sine of the shaft angle of the signal device 20 are 120 shaft angle degrees out of phase with each other.

Figure 5:
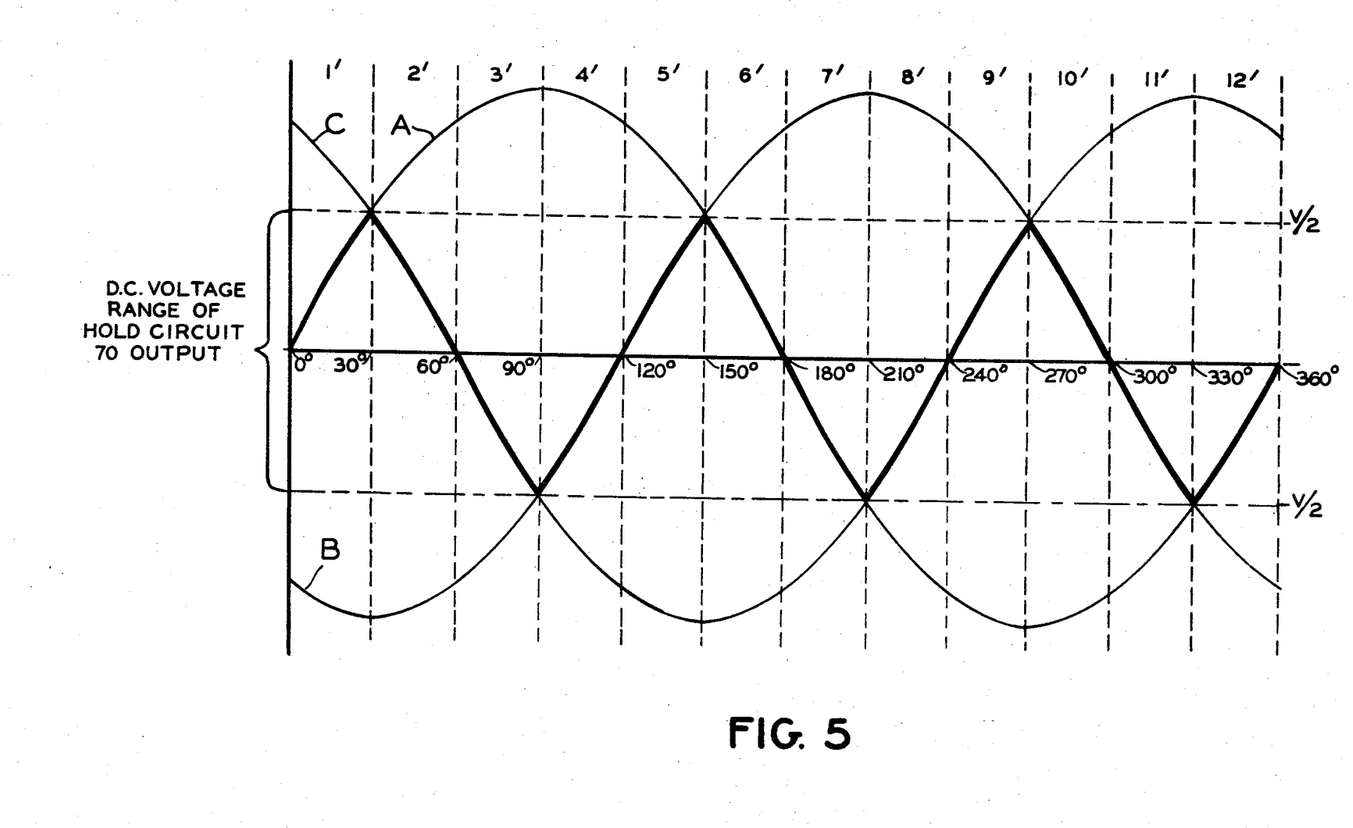
FIG. 5 is a graph showing the three outputs of a synchro including the intermediate output.

Referring to FIG. 5, the outputs of stator windings 23, 24 and 25 of signal device 20 are represented by the waveforms A, B and C, respectively. It should be noted that these waveforms represent envelopes of the three 400 hertz sinusoidal outputs of the signal device 20. As the shaft of signal device 20 is rotated through 360°, each waveform completes one cycle. In FIG. 5 the 360° are divided into 12 30° segments 1' through 12' to avoid ambiguities in the output of the synchronizer. The segments are determinable from the following conditions: A>B, A>C, B>C, A>0, B>0, and C>0. For example, a 160° angular shaft displacement lies in segment 6, the conditions that define that segment are A<B, A>C, B>C and A>0. The condition for all the segments 1' through 12' are shown in Table 1 below.

TABLE 1

| Segment | Condition | AND Gate Having Negative Pulse Output | Sampling Circuit Enabled | Synchro Output Sampled |
|---|---|---|---|---|
| 1' | A>B, A<C, B<C, A>0 | 271 | 30B | B |
| 2' | A>B, A>C, B<C, C>0 | 275 | 30C | C |
| 3' | A>B, A>C, B<C, C<0 | 276 | 30C | C |
| 4' | A>B, A>C, B>C, B<0 | 279 | 30A | A |
| 5' | A>B, A>C, B>C, B>0 | 278 | 30A | A |
| 6' | A>B, A>C, B>C, A>0 | 264 | 30B | B |
| 7' | A<B, A>C, B>C, A<0 | 263 | 30B | B |
| 8' | A<B, A<C, B>C, C<0 | 267 | 30C | C |
| 9' | A<B, A<C, B>C, C>0 | 266 | 30C | C |
| 10' | A<B, A<C, B<C, B>0 | 270 | 30A | A |
| 11' | A<B, A<C, B<C, B<0 | 269 | 30A | A |
| 12' | A>B, A<C, B<C, A<0 | 273 | 30B | B |

Table 1 indicates which NAND gate in selector 34, as shown in FIG. 2, provides the negative pulse output; the segment meeting the conditions imposed by the relationship of the signal device 20 outputs; and the enabled sampling circuit in sampling means 30.

In FIG. 2, selector 34 receives the outputs of the signal device 20 and sampling pulses from the pulse generator 43. Selector 34 has 12 d.c. outputs, each output corresponding to one of the segments shown in FIG. 5. When the shaft of the signal device 20 is displaced through an angle θ, one NAND gate corresponding to the segment in which angle θ lies will have negative output pulses coinciding with the sampling pulses from generator 43 while the other 11 NAND gate outputs will be at a high d.c. voltage level.

For example, with the shaft of the signal device 20 displaced to an angle of 160°, the intermediate output is across stator winding 23 and is shown by waveform A in FIG. 5. The conditions, as previously stated, are A<B, or the voltage on terminal 36 is more positive than the voltage on terminal 32 in FIG. 2; A>C, or the voltage on terminal 32 is more positive than the voltage on terminal 39; B>C, or the voltage on terminal 36 is more positive than the voltage on terminal 39; and A>0, or the voltage on terminal 32 is positive with respect to ground. Comparators 202, 203 and 205 will have high level d.c. outputs while comparator 200 will have a low level d.c. output enabling NAND gates 209, 214, 217 and 221. Sampling pulses from the generator 43 appearing on terminal 46 will pass through and be inverted by those NAND gates. The negative output pulses of NAND-gates 209, 214, 217 and 221 are inverted by NOT-OR gates 231, 234, 238 and 243 and applied to NAND-gate 264 causing said gate to have negative output pulses which are applied to conductor 306.

The selector 34 negative output pulses will activate a sampling circuit 30A, 30B or 30C of the sampling means 30 as shown in FIG. 3 as a function of outputs A, B or C from signal device 20 depending on which is an intermediate output with respect to the other outputs. Returning to the example, the negative pulses on conductor 306 are inverted by NOT-OR gate 350 and applied to NAND-gate 353 simultaneously with the sampling pulses appearing on terminal 45. The negative output pulses of NAND-gate 353 are inverted by inverter 355 and applied to the sampling network 360. Each sampling pulse on terminal 45 causes sampling network 360 to pass to terminal 68 a pulse corresponding to the peak amplitude of the output from stator winding 23 since the output from stator winding 23 is the intermediate output from signal device 20.

The hold circuit 70 receives the pulse output of sampling means 30 and provides a d.c. voltage which varies as a function of the sine of the angular displacement of the shaft of the signal device 20, as shown in FIG. 5.

Detector 22 receives the d.c. output of hold circuit 70 and sinusoidal and square wave outputs from source 1 and provides, at its output terminal 91, a series of pulses related in time to the square wave outputs of source 1 and corresponding in quantity to the relationship of the d.c. output of hold circuit 70 and the sinusoidal outputs of source 1.

Referring to FIG. 4, comparator 401 of detector 22 compares the 400 hertz sine wave 0° reference appearing on terminal 21 to the d.c. output of the hold circuit 70 appearing on terminal 71. The 400 hertz sinusoidal voltage, 180° out of phase, present on terminal 47 of detector 22 is compared to the output voltage of the hold circuit 70 by comparator 404. Comparator 407 compares a ground reference to the d.c. output of the hold circuit 70 present at terminal 71. At an angle of displacement of 160°, the output of the hold circuit 70 is greater than ground reference.

Figures 6A, 6B:
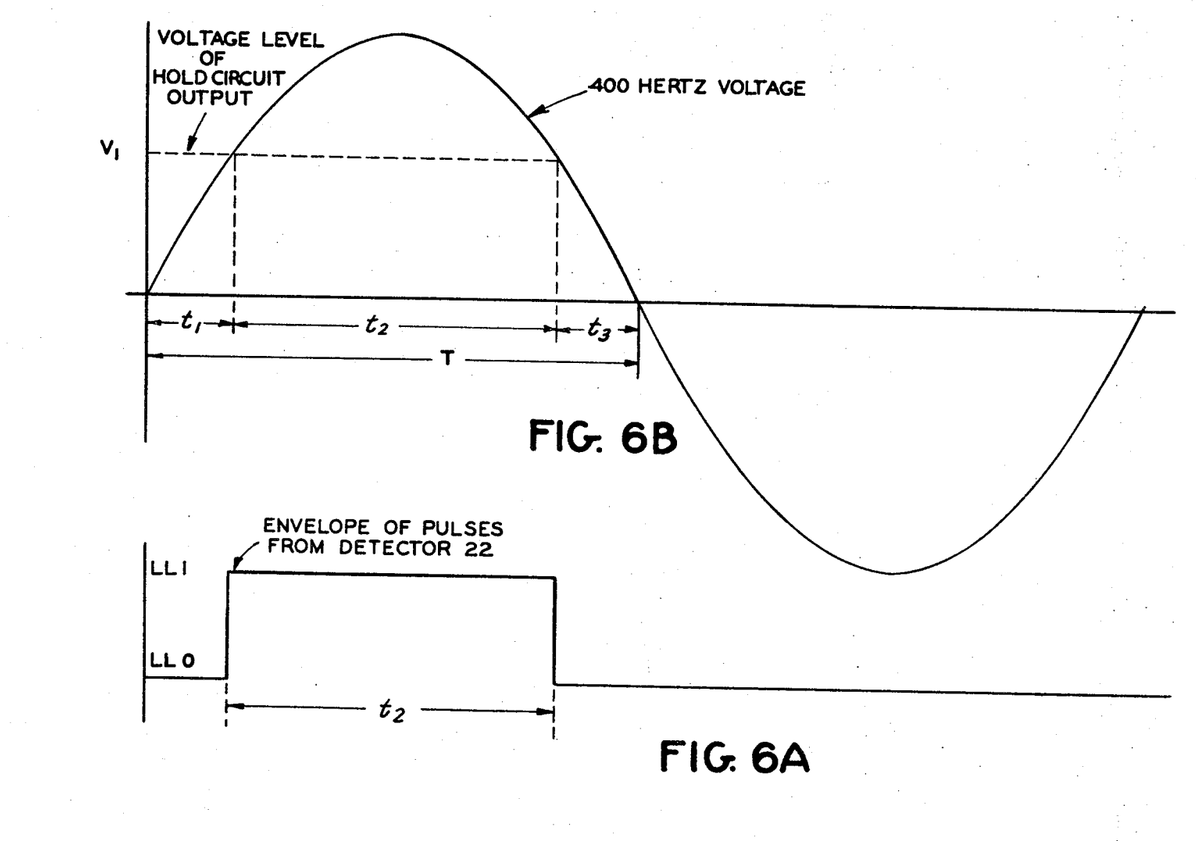
FIG. 6A shows the output of the detector shown in detail in FIG. 4.
FIG. 6B shows the relationship between the excitation voltage and the output of the hold circuit shown in FIG. 1.

Comparators 401 and 407 will each pass a pulse, during the positive portion of the cycle, whose width is controlled by the level of the hold circuit 70 d.c. output as shown in FIG. 6. The pulses do not occur together due to the 180° phase difference between the voltages at terminals 21 and 47. At an angle of 160°, the pulse from comparator 402 partially enables NAND-gate 413. Comparator 407 has a low-level d.c. output since the voltage at terminal 71 from the hold circuit 70 is positive with respect to ground and that output disables NAND-gate 420. The output of comparator 407 is inverted to a high-level d.c. voltage by inverter 421 and applied to NAND-gate 413 fully enabling it along with the output of comparator 401.

Coincidence of the positive portions of the 400 hertz square wave at terminal 48 and the 204.8 kilohertz square wave at terminal 54 of detector 22 causes the enabled NAND-gate 413 to provide a maximum of 256 pulses for one cycle of the 400 hertz square wave.

The determination of the maximum pulse count of 256 pulses per cycle of the 400 hertz sinusoidal wave is computed as follows:

Referring to FIG. 6A the actual time duration of the output of detector 22 is a function of the angle $\theta$ and since the output is in the form of timing pulses, the quantity of timing pulses is a function of the angle $\theta$. By way of example, comparator 401 in the detector 22 will have an output when the 400 hertz sinusoidal voltage exceeds the level of the output from the hold circuit 70 as shown in FIG. 6B. This occurs after a time interval $t_1$. The pulse is terminated when the 400 hertz voltage diminishes to a value less than the output of the hold circuit 70 and its width is the time interval $t_2$. The remaining time interval of the half cycle is $t_3$. The time for the half cycle is $T$, therefore:

$$T = t_1 + t_2 + t_3 \quad (1)$$

Due to the symmetry of the sinusoidal voltage $$t_1 = t_3 \quad (2)$$

and equation (1) may be rewritten as $$T = 2t_1 + t_2 \quad (3)$$

or $$t_1 = \tfrac{1}{2}(T - t_2). \quad (4)$$

The equation for the output voltage of the hold circuit may be written as $$V_{70} = V \sin \theta \quad (5)$$

Where $V$ is the peak voltage present at terminal 8 of source 1, and $\theta$ is the angle of displacement of the rotor winding 18 of the signal device 20.

The sinusoidal voltage is equal to the output of the hold circuit 70 at the end of the time interval $t_1$. It follows that $$\sin \theta = \sin \omega t_1 \text{ or} \quad (6)$$

$$\theta = \omega(2/\omega t_1) \quad (7)$$

where $\omega$ is the frequency of the voltage present at terminal 8 of source 1.

Substituting the value for $t_1$ that is shown in equation (4), equation (7) can be written as $$\theta = (\omega/2)(T - t_2) \text{ or} \quad (8)$$

$$t_2 = T - (2)\omega) \theta. \quad (9)$$

By definition $$\omega = 2\pi f \quad (10)$$

where $f$ is the reciprocal of the period of the wave. Thus equation (10) may be written as $$\omega = 2\pi/2T = \pi/T \quad (11)$$

and substituting equation (11) into equation (8) and rewriting, $$\theta = (\pi/2) - (\pi/2)(t_2/T) \text{ or} \quad (12)$$

$$t_2 = T - (2T/\pi)\theta. \quad (13)$$

However 2, $T$ and $\pi$ are constants so that $$t_2 = K_1 - K_2 \theta. \quad (14)$$

Equation (14) shows that the pulse width $t_2$ varies as a function of the variable $\theta$ and hence the quantity of timing pulses contained in the output of detector 22 is a function of $\theta$.

However, in use the output of hold circuit 70 is not allowed to exceed $V/2$ since it is dependent on the intermediate output of the signal source 20 while the sinusoidal voltage maximum amplitude is $V$. Therefore, equation 14, as applied to the detector 22, is only required to be valid within the range of the hold circuit 70 output for $0° \leq \theta \leq 30°$ and $150° \leq \theta \leq 180°$. Counter/register 77 is preset to the proper value and counting direction in order to account for the constant $K_1$ and the sign of $K_2$ from equation (14), as well as to allow for the relative phase shift and ambiguities present in the outputs of the signal device 20 sampled one at a time.

The present digital synchronizer has an accuracy of 10 bits. Mathematically the accuracy is stated as $$2^{10} \text{ bits} = 360° = 1024 \text{ bits or} \tag{15}$$

$$1 \text{ bit} = 0.3514° \tag{16}$$

Referring to equation (12), the counting rate is the coefficient $\pi/2T$ $$\pi/2 = 90° = \tfrac{1}{4} \text{ of full count} = 256 \text{ bits} \tag{17}$$

$$T = 1/800 \text{ sec.} \tag{18}$$

$$f \text{ clock} = 256 \times 800 = 204.8 \text{ KH}_z \tag{19}$$

Hence to develop the 1024 bit accuracy, the NAND gates are gated by the 400 hertz square wave and the 204.8 kilohertz square wave. The ratio of 204.8 kilohertz to 400 kilohertz is 512. However, comparator 401 or 404 pulse output will only occur during one half of a cycle of the 400 hertz per excitation signal. Therefore, the maximum number of bits that can occur is 256 bits. A bit is equal to one pulse from detector 22.

Referring to FIG. 1, counter/register 77 provides two functions; it counts the output of detector 22 and transfers the count to the serial subtractor 89, and it accepts the difference from the subtractor 89 for parallel transfer of the difference to register 86. Counter/register 77 receives, from control circuit 52, a clearing pulse that resets the counter/register 77 to zero prior to every count, a preset command that sets the counter/register 77 to a count corresponding to an angle of 30°, 90°, 150°, 210°, 270° or 330° and a high level d.c. voltage "up" command or "down" command that causes the counter/register 77 to count up or count down from the preset count when it receives the pulse output from detector 22. Control circuit 52 also provides shift pulses to counter/register 77 for serial shifting its contents. Table 2 below relates the actual angular displacement of signal device 20 and the operation range segment to the preset angle and the counting sequence.

TABLE II

| Operation Range Segment | Angle θ | Preset Angle | Counting Sequence |
|---|---|---|---|
| 1' | 360°, 0°–30° | 90° | down |
| 2' | 30°–60° | 330° | up |
| 3' | 60°–90° | 150° | down |
| 4' | 90°–120° | 30° | up |
| 5' | 120°–150° | 210° | down |
| 6' | 150°–180° | 90° | up |
| 7' | 180°–210° | 270° | down |
| 8' | 210°–240° | 150° | up |
| 9' | 240°–270° | 330° | down |
| 10' | 270°–300° | 210° | up |
| 11' | 300°–330° | 30° | down |
| 12' | 330°–360°, 0° | 270° | up |

For purposes of illustration, assuming the angle θ is 0°, during the positive portion of one cycle of the 400 hertz excitation voltage, 256 pulses, representing 90°, are applied to counter/register 77. Since counter/register has been preset to 256 and commanded to count down by the control circuit 52, each pulse from detector 24 will decrease the count in counter/register 77, until the count of 0° is reached. Counter/register 77 contains the count relating to actual flight.

Control circuit 52 receives the square wave outputs of source 1 at terminals 50 and 55, and the output of selector 34 at terminal 62 representing a plurality of terminals. Control circuit 52 contains logic circuitry for providing shift pulses to the counter/register 77, registers 83 and 86, and the subtractor 89, and provides inputs to counter/register 77 for presetting it. Control circuit 52 also provides voltages to counter/register 77 for controlling the counting sequence of counter/register 77.

Counter/register 77 applies its contents through a plurality of conductors, one for each stage in counter/register 77, to register 83 which will maintain the same contents as counter/register 77 prior to a command from the command source 125. After the command, the contents of counter/register 77 are prevented from entering register 83 and the contents that register 83 had at the time of the command are recirculated and are thus locked in. Register 83 output is used as a reference for developing error signals.

The contents of counter/register 77 and the contents of register 83 are applied serially to the serial subtractor 89 through terminals 99 and 112, respectively. Prior to receipt of a command from command source 125, register 83 contains the same contents as counter/register 77 and the output of the serial subtractor 89 is binary zero which is entered into counter/register 77 through terminals 102 and 103 of the subtractor 89 and counter/register 77, respectively. When counter/register 77 contains the resulting difference, the contents of counter/register 77 is parallel applied to difference register 86, through terminals 94 and 95, which applies the contents of register 86 to readout device 120 and to digital-to-analog converter 122 whose analog output is applied to the aircraft control system 130.

Upon application of a low-level d.c. voltage, automatic control command, from command source 125 to register 83, the contents of counter/register 77 are prevented from entering register 83. Subsequent changes in the angular shaft position of the signal device 20 results in a change of the contents of counter/register 77 as heretofore explained, but register 83 will retain the same contents prior to the automatic control command. Therefore, register 83 contains a reference count for the automatic control of mode of operation, locked in, while the contents of counter/register 77 can vary.

The outputs of counter/register 77 and register 83 applied to the serial subtractor 89 after the automatic control command from command source 125 causes subtractor 89 to have a binary output representing the difference between the contents of counter/register 77 and register 83, and the output is fed back to counter/register 77. While the difference is being entered into counter/register 77, the detector 22 does not have an output. The counter/register 77 accepts the difference figure until all bits of the binary word are in counter/register 77 at which time it parallel transfers the binary information to the difference register 86. Register 86 provides for temporary storage of the difference. Register 86 applies the difference to readout device 120 or the analog-to-digital converter 122 whose output is applied to the aircraft control system 130 for correcting aircraft flight until the difference contained in register 86 is zero. Register 83 recirculates its contents through terminals 110 and 111 so that after the subtraction by the subtractor 89, register 83 will have the same contents it had prior to the subtraction. The necessary correction to aircraft flight is slight since just prior to the automatic control command, the counter/register 77 and the register 83 had the same counts.

In summary, the signal device 20 provides output signals related to actual flight of aircraft. The output signals are converted to a d.c. voltage related to actual flight by sampling means 30 and hold circuit 70. The d.c. voltage and outputs from source 1 cause detector 22 to provide timing pulses whose quantity is related to the actual flight of the aircraft as indicated by the angular displacement of the signal device's 20 shaft. Counter/register 77 is preset to an angle and counts up or down from that angle under the control of control circuit 52. Register 83 will accept the contents of counter/register 77 until an automatic control command from command source 125 causes register 83 to lock in the count present at the time of the command. The contents of counter/register 77 and register 83 are applied to subtractor 89 and subtractor 89 obtains the difference between the two contents. The difference is serially entered in counter/register 77 until the complete binary information for the parallel transferred is in control system counter/register 77 at which time the difference is paralleltransferred to register 86 which in turn applies the difference to read-out device 120 or to the aircraft controlsystem 130.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

We claim:

1. A selector adapted to receive three a.c. voltages of different amplitudes and to determine the voltage of intermediate amplitude, comprising means for comparing the three a.c. voltages with each other and with a ground reference and providing an output corresponding to the comparison of the three a.c. voltages with each other and with the ground reference and switching means connected to the comparing means and providing an output for determining the a.c. voltage of intermediate amplitude;

the comparing means including first, second and third comparators with each comparator comparing a different combination of two of the three a.c. voltages and providing outputs corresponding to the relationship of the three a.c. voltages with each other, fourth, fifth and sixth comparators with each comparator comparing an a.c. voltage with the ground reference and providing outputs corresponding thereto, inverters connected to the outputs of each of the first, second, third, fourth, fifth and sixth comparators and a plurality of NAND gates connected to the inverters and to said comparators and providing an output corresponding to the a.c. voltage of intermediate amplitude.

2. A detector for providing timing pulses corresponding to the amplitude of a d.c. voltage, comprising means for comparing the d.c. voltage with a ground reference to determine polarity of the d.c. voltage and with a.c. voltages of opposite phase to provide pulses of a width corresponding to the amplitude of the d.c. voltage, and switching means connected to the comparing means and responsive to the pulses and passing timing pulses corresponding in number to the pulse width;

the comparing means including a first comparator for comparing the d.c. voltage with one a.c. voltage and providing pulses of a width corresponding thereto, a second comparator for comparing the d.c. voltage with the other a.c. voltage of opposite phase and providing a pulse of a width corresponding thereto, and a third comparator for comparing the d.c. voltage with the ground reference and providing an output corresponding thereto and in which the switching means incldes an inverter connected to the third comparator, a first NAND gate connected to the first comparator and to the inverter, a second NAND gate connected to the second and third comparators, the first NAND gate being controlled by the output of the first comparator and the inverter and the second NAND gate being controlled by the output of the second and third comparators so that one of the NAND gates passes timing pulses corresponding in number to the pulse width.

* * * * *